Patented Sept. 18, 1928.

1,684,593

UNITED STATES PATENT OFFICE.

FREDERICK W. McRAE, OF EAGLE ROCK, CALIFORNIA, ASSIGNOR TO McRAE PAINT PRODUCTS, INC., OF LOS ANGELES, CALIFORNIA, A CORPORATION OF CALIFORNIA.

PAINT OR WATERPROOFING MATERIAL AND PROCESS OF PRODUCING THE SAME.

No Drawing. Continuation of application Serial No. 154,045, filed December 10, 1926. This application filed March 13, 1928. Serial No. 261,416.

This application is a continuation of application Serial #154,045, filed December 10, 1926.

This invention relates to the production of a paint or waterproofing material of improved properties.

More particularly an object of the present invention is to provide a paint or waterproofing material having a mined asphaltic base, which paint is more penetrating than any similar paint or waterproofing material now in use and which will provide a covering or coating more durable and resistant to acids than the paints usually employed.

Another object of the present invention is to provide a process by which a paint or waterproofing solution is obtained, which upon application will dry to a rubber-like or elastic coating which is alkali resistant and adapted to act as a rust eliminator, can be caused to seal concrete and prevent the escape of moisture therefrom while the concrete is curing, is acid resistant, and possesses a number of properties entirely novel in a paint or waterproofing material.

More particularly, I have discovered that mined asphalts, when heated to extremely high temperatures sufficient to distill out the light oils normally present therein, and then combined immediately with cold solvents, will produce a base for a paint or waterproofing materials in which there are incorporated in suspension or colloidal solution certain bodies which are not normally retained in paints of the kind and are of great benefits in the paints. It appears that mined asphalts possess certain materials which precipitate out of ordinary paint or waterproofing material in the usual methods of dissolving such asphalt in solvents but which can be incorporated with the paint or waterproofing material in a very stable form where the solvent is added under the conditions of the present process.

The process of the present invention together with various further objects and advantages thereof will be readily understood from a description of a preferred method of producing a base or waterproofing material embodying the invention. For this purpose, I will therefore hereinafter set forth in considerable detail an example of a method embodying the invention.

The basic raw material employed in the process is mined asphalt. It is further found that certain asphalts are much superior to others in the process for reasons not as yet fully ascertained. For example, the process as now developed operates more satisfactorily upon and produces superior results in connection with mined asphalts as compared with asphalts derived from distillation of petroleum oil.

Moreover of the mined asphalts, certain particular properties are found in the so-called Trinidad type asphalt, particularly when used in connection with gilsonite. By Trinidad type asphalt I mean asphalt mined from Trinidad Lake, or any natural asphalt having substantially the same composition as asphalt mined from Trinidad Lake. Therefore, the preferred process employs both of such asphaltic materials.

As a typical example of the present invention, 60 parts or pounds of Trinidad type natural asphalt is placed in a closed vat except for an exhaust pipe, and therein heated to a temperature sufficient to drive out and distill over all of the light oils naturally in the asphalt. For example, the Trinidad type asphalt is heated to a temperature of approximately 400° F. and maintained at such temperature for a period of approximately 18 hours. A relatively small amount of light naphtha will distill off from the asphalt which is preferably condensed. At the same time, approximately 40 parts or pounds of gilsonite is placed in a smaller vat and heated for approximately the same period of time at a temperature of approximately 600° F. or other period sufficient to distill over all of the light naphtha which gilsonite is adapted to yield. By this process, there is obtained an asphaltic residuum from the two materials which are run together in a common mixing vat and fused together until a homogeneous material is obtained.

The heating of the Trinidad type asphalt and gilsonite drives off a peculiar light solvent of great penetrating powers which it is desirable to eliminate from the paint or waterproofing material to be produced.

The Trinidad type asphalt normally must not be heated as high as the gilsonite during this process as at 600° F., the Trinidad type asphalt burns or cracks and carbon is thrown down. Moreover, it appears necessary that the gilsonite be at a higher temperature at the time the gilsonite residue and Trinidad type residue are mixed together.

The admixed asphaltic residues are stirred together until they are cooled to a temperature of approximately 350° to 400° F., at which time a solvent is added thereto in such a way as to both immediately chill and dissolve the asphaltic materials or the major part thereof. As the solvent to be employed, I prefer to employ a distillate of petroleum of a gravity between 46° and 52° Baumé although it is understood that other solvents of asphaltic materials may be employed. The distillate is added to the asphalt in proportions of aproximately 320 gallons of distillate to 2000 pounds Trinidad type asphalt and 1200 pounds of gilsonite. The distillate is added as fast as it can be introduced into the vat holding the asphaltic material so that the distillate all comes into contact with the asphaltic residuum at substantially the same time. This instantly cools and disperses the asphaltic material throughout the distillate whereby constituents of the asphaltic material become dissolved, emulsified, or permanently suspended in the solvent which do not normally dissolve or become suspended therein. It is understood that the asphaltic material is agitated during the addition of said distillate and the agitation continued until the produced solution has considerably cooled.

When the distillate is first added to the asphaltic material a certain amount of the same will be distilled or vaporized therefrom and the mixing should, therefore, be done in a vat connected with a line for drawing off said distillates preferably to a condenser.

After the addition of the distillate or solvent for the asphaltic materials, the material is permitted to settle at which time there will precipitate out a sludge, which sludge is composed largely of dirt, sulfur and some heavy tarry substances. The amount of sludge settled out usually constitutes about 10 per cent of the solids employed.

The solution separated from the precipitated matter constitutes the basic paint which is found to possess very high penetrating powers and is capable of drying to form a very tough film which does not readily crack and is acid and alkali resistant. A most important and valuable property of this paint is found in its capacity to adhere to wet, uncured concrete and to seal the same against the escape of moisture until the concrete is completely cured. This property is due to the fact that the asphalt is subjected to heat for a sufficiently prolonged period of time to drive off certain light oils which if present would render the paint non-miscible with water. Still another property of the basic paint is the fact that it is found to be capable of preserving materials from the destructive action of white ants.

Where the paint or waterproofing material is to be exposed to direct rays of the sun or applied to a very porous material for waterproofing the same, there may be added to the paint or waterproofing material a quantity of pigment, such as graphite, lamp black, ground metal, etc.

While the process and product herein described are well adapted for carrying out the objects of the present invention, it is understood that the invention includes all such modifications and changes as come within the scope of the following appended claims.

I claim:

1. A process of the class described, which comprises heating Trinidad type asphalt to a temperature and for a period of time sufficient to vaporize substantially all light oils therefrom, and then adding to the hot asphaltic residue a petroleum cold distillate so as to both immediately cool and dissolve the asphaltic residue in said distillate.

2. In a process of the class described, heating Trinidad type asphalt and gilsonite separately to a temperature sufficient to drive out light oils therefrom, mixing the residual asphaltic materials, and adding thereto while the asphaltic materials are still hot a petroleum distillate at such a rate as to rapidly cool the asphaltic material to dissolve and permanently suspend the same in the distillate.

3. A process of producing a paint or waterproofing material which comprises heating gilsonite and Trinidad type asphalts separately and at different temperatures to drive out the light oils therein, mixing the asphaltic materials, and quickly cooling and dissolving the same in a solvent by the immediate application of all of the solvent to be employed to the asphaltic material while the same is still hot to permanently suspend said asphaltic material therein.

4. A paint or waterproofing material capable of adhering to wet, uncured concrete comprising as its basic constituent Trinidad type asphalt from which substantially all of its more volatile constituents have been eliminated permanently suspended in a petroleum distillate.

5. A paint or waterproofing material capable of adhering to wet, uncured concrete comprising Trinidad type asphalt and gilsonite from which substantially all of their more volatile constituents have been eliminated mixed in suitable proportions and permanently suspended in a solvent of petroleum distillate.

6. A process of the class described which comprises heating Trinidad type asphalt to a temperature maintained for a sufficient period of time to substantially complete the vaporization of the light oils of said asphalt, then adding to the hot asphaltic residual a cold petroleum distillate so as to immediately cool and dissolve the organic constituents and permanently suspend inorganic constituents of the asphaltic residue in said distillate and adding thereto a pigment.

Signed at Los Angeles, California, this 9th day of March, 1928.

FREDERICK W. McRAE.